United States Patent
Xu et al.

(10) Patent No.: US 9,259,844 B2
(45) Date of Patent: Feb. 16, 2016

(54) VISION-GUIDED ELECTROMAGNETIC ROBOTIC SYSTEM

(71) Applicant: GENERAL ELECTRIC COMPANY, Schenectady, NY (US)

(72) Inventors: Yi Xu, Niskayuna, NY (US); Lynn Ann DeRose, Gloversville, NY (US); Weston Blaine Griffin, Niskayuna, NY (US); Ying Mao, Niskayuna, NY (US); Xianqiao Tong, Blacksburg, VA (US); Balajee Kannan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 227 days.

(21) Appl. No.: 14/178,902

(22) Filed: Feb. 12, 2014

(65) Prior Publication Data

US 2015/0224650 A1    Aug. 13, 2015

(51) Int. Cl.
| | |
|---|---|
| *G06K 9/00* | (2006.01) |
| *B25J 15/06* | (2006.01) |
| *B25J 9/16* | (2006.01) |

(52) U.S. Cl.
CPC ............ *B25J 15/0608* (2013.01); *B25J 9/1697* (2013.01); *Y10S 901/40* (2013.01); *Y10S 901/47* (2013.01); *Y10S 902/02* (2013.01)

(58) Field of Classification Search
None
See application file for complete search history.

(56) References Cited

U.S. PATENT DOCUMENTS

| | | | | | |
|---|---|---|---|---|---|
| 5,129,044 | A | * | 7/1992 | Kashiwagi | B25J 9/1633 700/251 |
| 5,159,249 | A | * | 10/1992 | Megherbi | B25J 9/1664 318/568.1 |
| 5,448,146 | A | * | 9/1995 | Erlbacher | B25J 9/1633 318/568.17 |
| 5,497,061 | A | * | 3/1996 | Nonaka | B25J 9/1633 318/568.1 |

(Continued)

FOREIGN PATENT DOCUMENTS

| | | | |
|---|---|---|---|
| JP | 09029678 A | * | 2/1997 |
| WO | 2010149185 A1 | | 12/2010 |
| WO | 2011159778 A2 | | 12/2011 |

OTHER PUBLICATIONS

Clearing a pile of unknown—Perception, Katz et al., CMU-RI-TR-12-34, Nov. 2012, pp. 1-17.*

(Continued)

*Primary Examiner* — Jayesh A Patel
(74) *Attorney, Agent, or Firm* — Melissa K. Dobson

(57) ABSTRACT

Embodiments of the disclosure comprise a vision-based robotic manipulation system that identifies, singulates, and removes an individual surgical instrument from a cluttered environment. A computer-vision algorithm incorporated with the system is robust against optical challenges such as changing light conditions, specularities, and inter-reflections among various surgical instruments. The system estimates 2D pose (as opposed to a more challenging 3D pose) using a camera with normal room lighting to identify each object, including its specified data matrix barcode; and incorporates the use of a robotic arm with a compliant electromagnetic gripper to handle objects having large shape variance. The system can then relocate the objects as desired. The robot manipulator is utilized in hospital and research settings, manufacturing, and sterile environments.

22 Claims, 11 Drawing Sheets

(56) References Cited

U.S. PATENT DOCUMENTS

| | | | | |
|---|---|---|---|---|
| 5,920,679 | A * | 7/1999 | Ge | B25J 9/1664 318/568.15 |
| 6,075,905 | A * | 6/2000 | Herman | G06K 9/32 348/588 |
| 6,205,839 | B1 * | 3/2001 | Brogårdh | B25J 9/1692 318/568.16 |
| 7,155,316 | B2 | 12/2006 | Sutherland et al. | |
| 7,164,968 | B2 | 1/2007 | Treat et al. | |
| 7,177,459 | B1 | 2/2007 | Watanabe et al. | |
| 7,983,487 | B2 | 7/2011 | Agrawal et al. | |
| 7,997,847 | B2 | 8/2011 | Treat et al. | |
| 8,295,975 | B2 | 10/2012 | Arimatsu et al. | |
| 8,406,923 | B2 | 3/2013 | Ueyama et al. | |
| 8,423,182 | B2 | 4/2013 | Robinson et al. | |
| 8,521,331 | B2 | 8/2013 | Itkowitz | |
| 8,559,699 | B2 * | 10/2013 | Boca | B25J 9/1679 382/153 |
| 8,897,919 | B2 * | 11/2014 | Sato | B25J 9/1633 700/1 |
| 2002/0013675 | A1 * | 1/2002 | Knoll | B25J 9/1692 702/150 |
| 2007/0199399 | A1 * | 8/2007 | Okazaki | B25J 9/104 74/490.05 |
| 2008/0025568 | A1 * | 1/2008 | Han | G06K 9/4642 382/103 |
| 2008/0140257 | A1 * | 6/2008 | Sato | B25J 9/1633 700/258 |
| 2008/0181485 | A1 * | 7/2008 | Beis | B25J 9/1697 382/153 |
| 2009/0116728 | A1 | 5/2009 | Agrawal et al. | |
| 2009/0234502 | A1 | 9/2009 | Ueyama et al. | |
| 2009/0290758 | A1 * | 11/2009 | Ng-Thow-Hing | G06T 7/0042 382/106 |
| 2010/0092093 | A1 * | 4/2010 | Akatsuka | G06K 9/6211 382/203 |
| 2010/0234999 | A1 * | 9/2010 | Nakajima | B25J 9/1628 700/261 |
| 2011/0166709 | A1 * | 7/2011 | Kim | B25J 9/1612 700/260 |
| 2012/0165986 | A1 | 6/2012 | Fuhlbrigge et al. | |
| 2013/0128035 | A1 | 5/2013 | Johns et al. | |
| 2013/0164103 | A1 | 6/2013 | Baker | |
| 2013/0266205 | A1 | 10/2013 | Valpola | |

OTHER PUBLICATIONS

Major et al., "Robotic Application of the Vision System for Object Distancing and Ranging", Circuits and Systems, 2000. Proceedings of the 43rd IEEE Midwest Symposium on (vol. 3 ), pp. 1116-1119, 2000.

Sanchez et al., "Robot-Arm Pick and Place Behavior Programming System Using Visual Perception", Pattern Recognition, 2000. Proceedings. 15th International Conference on (vol. 4 ), pp. 507-510, 2000.

Carpintero et al., "Development of a Robotic Scrub Nurse for the Operating Theatre", Biomedical Robotics and Biomechatronics (Biorob), 2010 3rd IEEE RAS and EMBS International Conference, pp. 504-509, Sep. 2010.

* cited by examiner

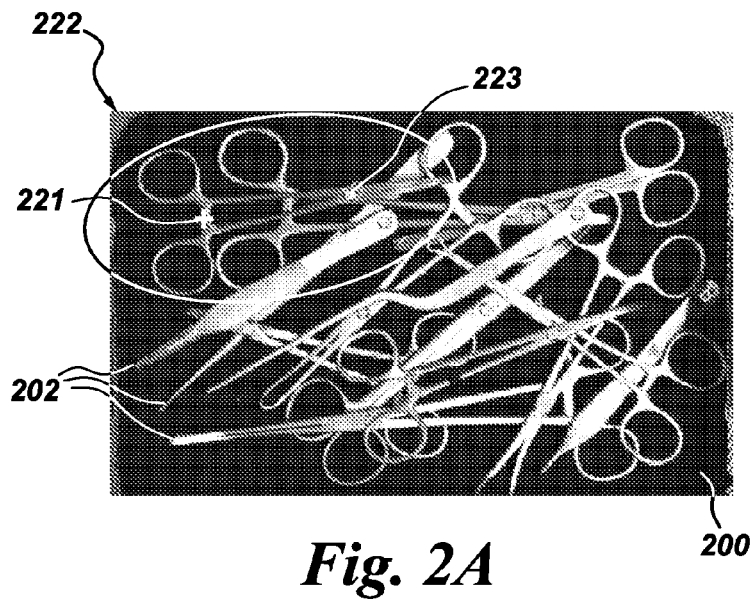
Fig. 2A
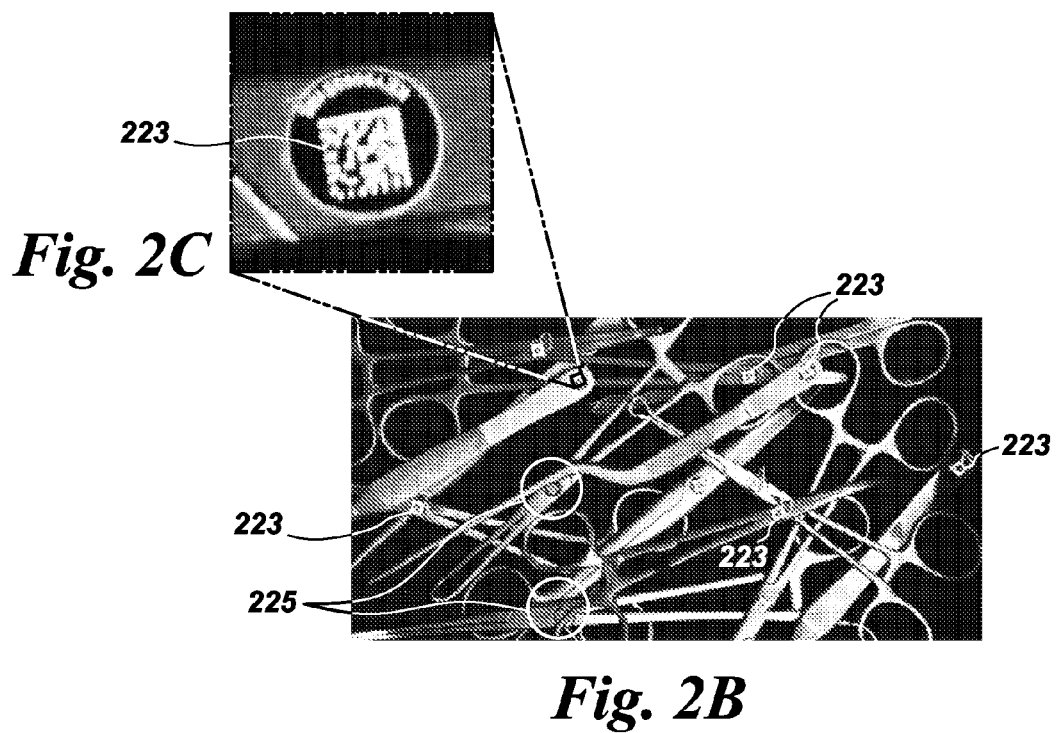
Fig. 2C
Fig. 2B

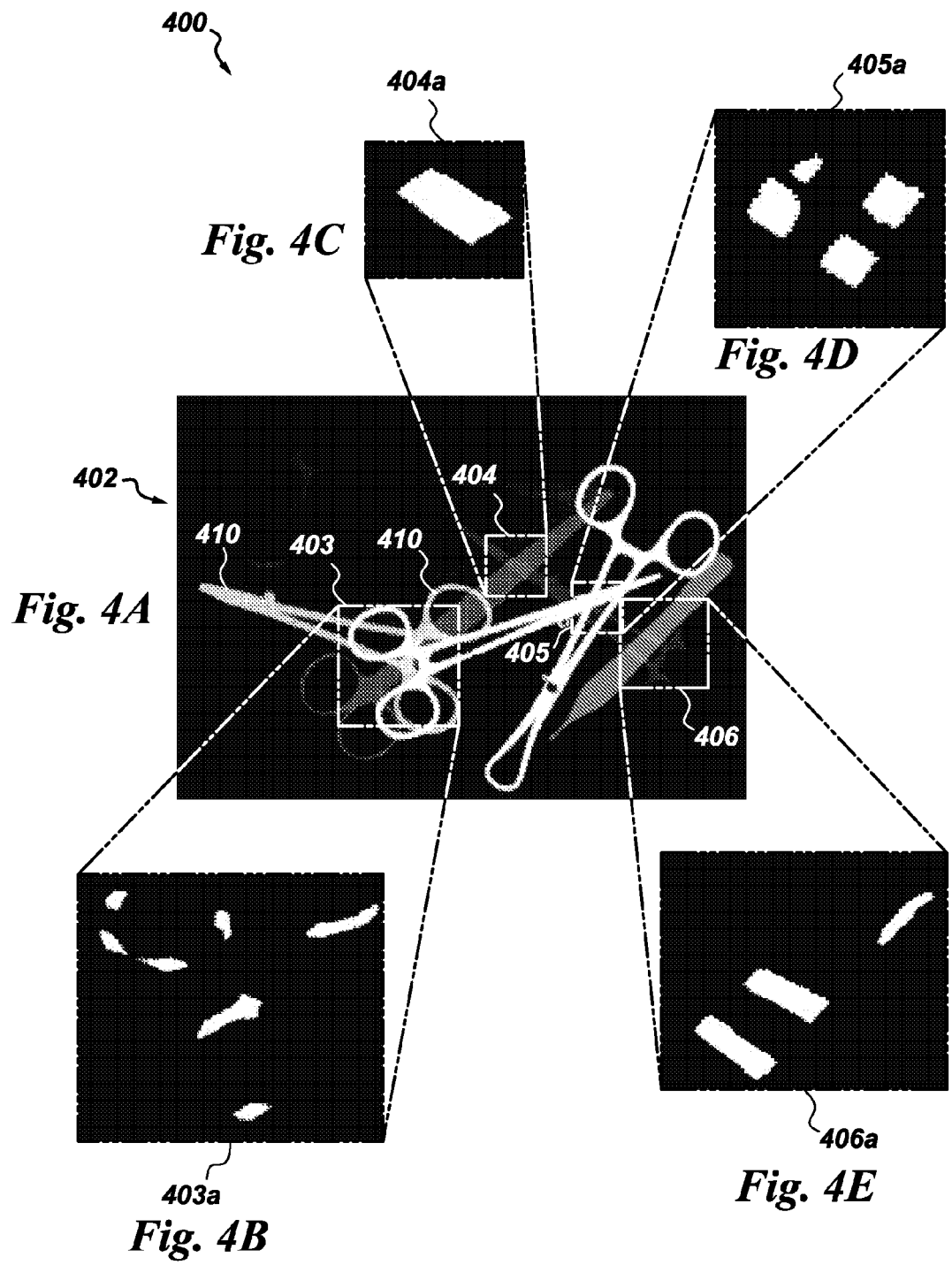

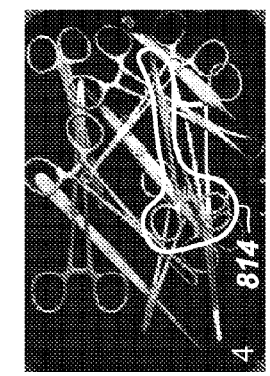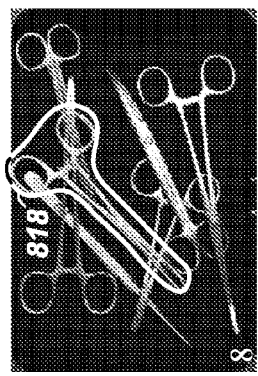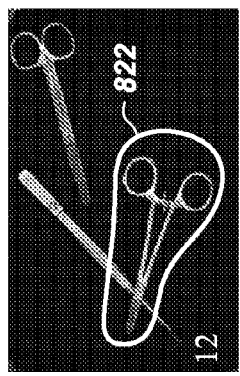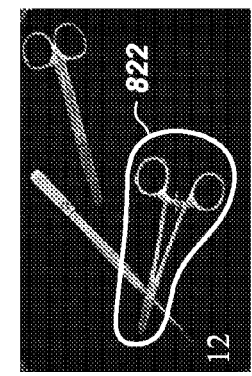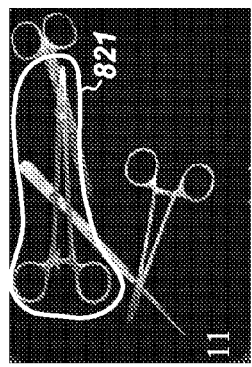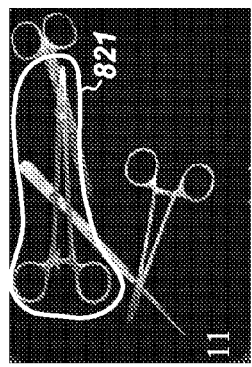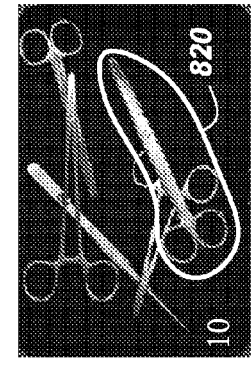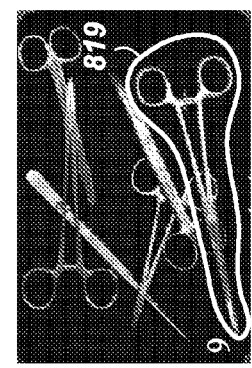

900

*1000*

VISION-GUIDED ELECTROMAGNETIC ROBOTIC SYSTEM

STATEMENT AS TO FEDERALLY SPONSORED RESEARCH & DEVELOPMENT

This invention was made with Government support under contract number VA118-12-C-0051 awarded by the Department of Veterans Affairs. The Government has certain rights in the invention.

FIELD

Embodiments relate generally to identifying and picking up objects in a clutter, and more particularly, to identification and gripping of surgical tools within a container.

BACKGROUND

The perioperative setting is considered a resource intensive section of the hospital. The logistics of sterilizing, sorting, building, and transporting surgical instruments is labor and capital intensive. In addition, infection due to improper sterilization is a safety hazard. Currently, processing of hundreds of types of surgical instruments with similar characteristics involves an extensive learning curve for hospital employees and diligent human performance.

Existing approaches to automating the sorting process are expensive and are limited in capability. One system currently utilized is designed to automate several key functions for the clean side of the sterile supply. With this system, a human operator first separates the surgical instruments from a pile, and places them on a conveyor belt one by one. Then a standard robotic arm fitted with a magnetic gripper picks up the single instrument, as isolated away from other instruments, from the belt. A machine vision system or a barcode scanner is used to identify the instrument and sort each instrument into a stack of similar instruments. Consequently, such solutions are limited when handling instrument manipulation in an unstructured environment where surgical instruments are cluttered in the container.

Picking individual items from an unordered pile in a container or in an unstructured environment with robotic equipment has proven overly burdensome and difficult. Picking surgical instruments is even more challenging. First, the surgical instruments often have similar characteristics, thus making it difficult for computer vision-based algorithms to recognize them from an unordered pile. Second, instruments are made of shiny metal. Optical effects such as specularities and inter-reflections pose problems for many computer-vision based pose estimation algorithms, including multi-view stereo, 3D laser scanning, active sensing (to acquire a depth map of the scene), and imaging with multiple light sources. One approach uses multi-flash cameras to obtain depth edge information and matches edge-based templates onto the input image for pose estimation. Edge-based template matching, however, has difficulty in distinguishing between very similar objects such as surgical instruments.

Typically, the current approaches have utilized each container having one object type. Most data-driven approaches to date use a multi-view approach to recognize objects in a scene and estimate their six degrees-of-freedom (DOF) poses. The approaches, however, rely on learned models for the objects. Since the surgical instruments have strong similarities, such a data-driven method is difficult to carry out. Without accurate six degrees-of-freedom (DOF) pose, many standard grippers have trouble executing the grip. Furthermore, when selecting the surgical instrument that is on top of the pile, typical appearance-based occlusion reasoning methods have trouble because objects which occlude others have a similar appearance as those being occluded.

It is therefore desirable to have a system as based on a vision-based bin-picking in unstructured environments as well as for use in current systems when selecting single objects. The invention would beneficially address current sterilization and safety hazards, while being capable of accurately singulating surgical instruments in a cluttered environment. The invention disclosure that follows addresses these challenges effectively.

SUMMARY

Embodiments of the invention employ a computer-implemented method of detecting and manipulating a plurality of instruments, the computer including a computer processor, and a camera with a barcode reading software module; the method comprising the steps of: creating a template image of each of the instruments by way of the camera and storing the template images in memory; capturing an input image of the plurality of instruments in the container; identifying each of the instruments by using the barcode reading software module that (i) reads an identification tag from each of the instruments and (ii) localizes reference points of the identification tag, each of the identification tags encoding a unique identifier; retrieving the template image from memory that corresponds to the identification tag; aligning one or more edges of the input image with edges of the template image to compute an initial affine transformation; computing an occupancy map that models one or more intersections between the instruments; and synthesizing occlusion relationships that correspond to one or more hypotheses, wherein the input image is compared against at least a first hypothesis and a second hypothesis; and wherein the template image and the input image are two dimensional and utilized in combination to select a top-most instrument from a cluttered pile.

In another embodiment, a vision-guided robotic system for instrument singulation implements the computer-implemented method described, the system comprising: a robotic arm; a camera with a barcode reading software module to identify and image the plurality of instruments; a computer processor; and one or more instruments positioned in a clutter at a first location. The vision-guided robotic system also comprises an electromagnetic gripper attached to the robotic arm, such that the electromagnetic gripper has adjustable gripping force, applied using an electromagnetic current that corresponds to each instrument. The electromagnet current value stored in a table indexed by the identification tag of the instrument such that the gripping force, or rather, electromagnetic current value is provided to the computer processor, as needed or in real-time. In one aspect, the gripping force is not actively controlled, such that a mapping correlates an electromagnetic current with an instrument. In another aspect, the gripping force may vary when contact position of the gripper with the instrument changes, as driven by the magnetized volume of the instrument.

In one embodiment, the robot manipulator arm has a dedicated controller for robot and electromagnetic gripper (end-effector) control. For exemplary purposes, and not limitation, the gripping electromagnetic current is controlled by a pre-calibrated value stored in a look-up table. The data from the table may be implemented with the robot controller or stored in any remote database accessible through a network connection. In another aspect, the electromagnetic current value may be retrieved from the vision processor.

As described, embodiments of the system may be implemented alone or in combination, the various aspects having similar purpose in manipulating instruments from one location to another. The processing of the instruments may be automated or manually controlled as desired.

BRIEF DESCRIPTION OF THE DRAWINGS

Features and aspects of embodiments are described below with reference to the accompanying drawings, in which elements are not necessarily depicted to scale.

FIG. 2 includes FIG. 2A, 2B, 2C and references barcodes that are recognized in the singulation step of an embodiment of the invention.

FIG. 2A illustrates a topmost instrument in a cluttered environment.

FIG. 2B illustrates various barcodes exposed and hidden in the clutter.

FIG. 2C is an expanded view of the barcodes utilized in the recognition scheme.

FIG. 3 includes FIGS. 3A, 3B, 3C, 3D that illustrate an embodiment of the invention whereupon pose estimation uses the corners (edges) of the barcodes (data matrices) to superimpose template image maps onto the input image, and pose refinement uses optimization to provide better alignment.

FIG. 4 includes FIGS. 4A, 4B, 4C, 4D, 4E and demonstrates an aspect of the invention including an occupancy map of the instruments, along with dilated binary masks of the intersection regions between instruments.

FIG. 4A depicts one embodiment of the invention.

FIG. 4B depicts a magnified view of one aspect of the embodiment of FIG. 4A.

FIG. 4C depicts a magnified view of one aspect of the embodiment of FIG. 4A.

FIG. 4D is a magnified view of one aspect of the embodiment of FIG. 4A.

FIG. 4E is a magnified view of one aspect of the embodiment of FIG. 4A.

FIG. 5 includes.

FIG. 8 portrays camera views from an experimental run in one embodiment:

FIGS. 8A (1), 8B (2), 8C (3), 8D (4), 8E (5), 8F (6), 8G (7), 8H (8), 8I (9), 8J (10), 8K (11), and 8L (12) depict sequential views of an embodiment of the invention as instruments are identified and removed one at a time.

FIG. 9 includes FIGS. 9A, 9B, 9C, and 9D which depict recovery events from failed attempts:

DETAILED DESCRIPTION

Figure 1:
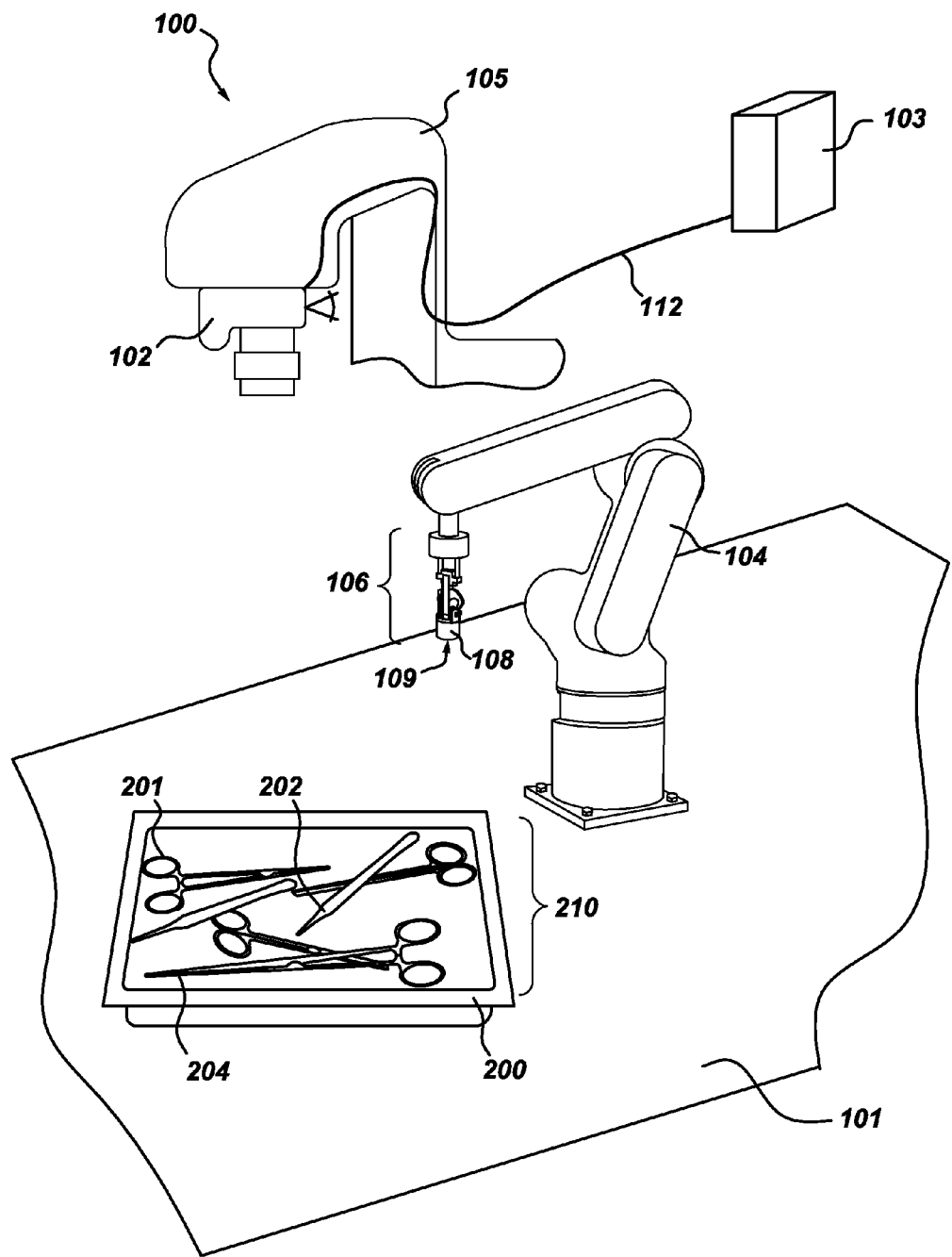
FIG. 1 depicts a perspective view of an embodiment of the system.
Figure 3A:
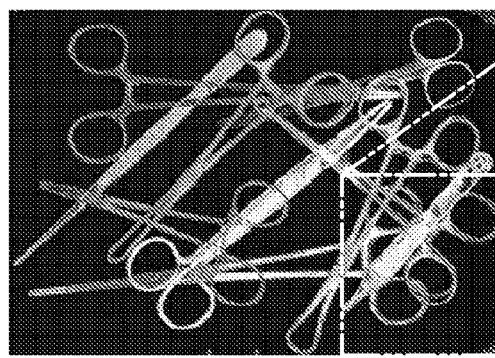
FIG. 3A illustrates one embodiment of the cluttered environment.
Figure 3B:
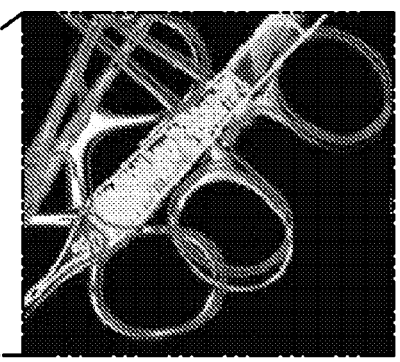
FIG. 3B is an expanded view of the highlighted region in FIG. 3A.
Figure 3C:
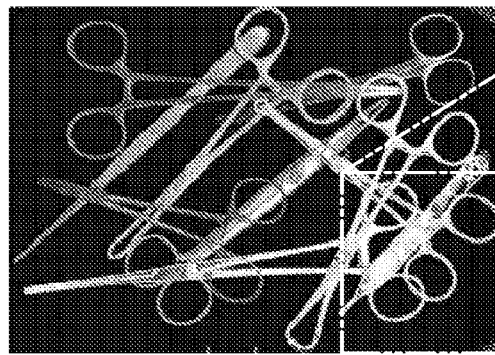
FIG. 3C depicts a cluttered environment in accordance with one embodiment.
Figure 3D:
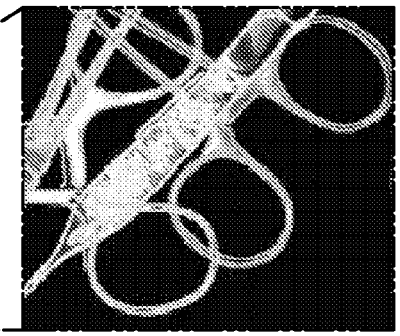
FIG. 3D is a magnified view of the designated region from FIG. 3C.
Figure 5A:
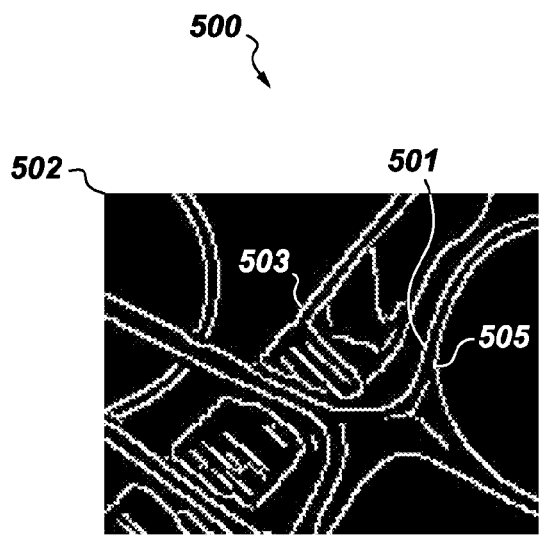
FIG. 5A a query image I generated by edge detection on the input.
Figure 5B:
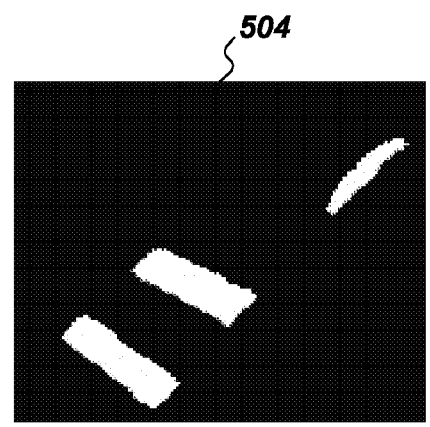
FIG. 5B depicts the associated intersection mask.
Figure 5C:
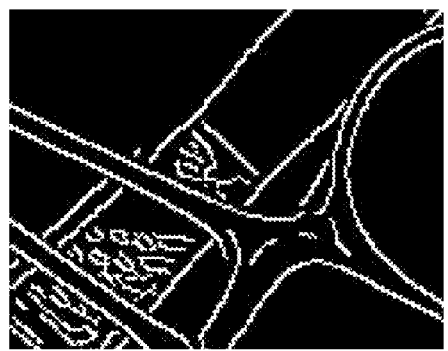
FIG. 5C and FIG. 5D provide two synthesized hypotheses in accordance with the images from FIGS. 5A and 5B, respectively.
Figure 5D:
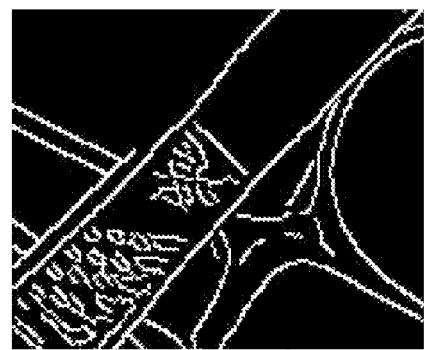

Embodiments are directed to systems and methods of accurately singulating surgical instruments in a cluttered environment. First, a single-view vision algorithm is used to identify surgical instruments from a pile and estimate their poses. Occlusion reasoning is performed to determine the next instrument to grip using a contrast invariant feature descriptor. Next, a compliant electromagnetic gripper is developed capable of picking up the identified surgical instrument based on its estimated pose. The solution is validated through experiments demonstrating identification, localization accuracy, and robustness of occlusion reasoning, as well as the flexibility of the electromagnetic gripper in successfully executing instrument singulation from a cluttered container.

In one embodiment of the invention, a vision-based robotic manipulation system 100 identifies, singulates, and removes an individual surgical instrument 201 from a cluttered environment of multiple instruments 201, 203, 204 within a container, or tray 200. The system 100 comprises a camera 102 integrated with a computer processor 103. The camera is positioned with a gantry 105 such that the processor implements a vision-based computer algorithm to identify/select an instrument 201 within a first location, a tray 200; and visually guides a robot manipulator 104 to grip and then place the instrument 201 to a second location (not shown). The camera 102 here is located on a gantry 105, or tripod, above the table 101 and above the robot manipulator 104. Thus, the system correlates relationships among a plurality of various instruments (e.g. 201, 203, 204, etc) within the tray 200 during selection such that each instrument is individually identified and its position estimated based upon its occlusion within the clutter, or pile 210, of instruments.

In another embodiment, the camera is mounted on the robot manipulator or arm. By moving the arm to a predefined location, it serves the purpose of a gantry 105. In one aspect, a high resolution camera is placed on a gantry. In another aspect, a camera (potentially low resolution) is placed with the arm to scan the desired field, or full field of view, by taking a collection of images.

In an embodiment of the invention, the system 100 integrates an end-effector, an electromagnetic gripper 106, which is attached to a six-axis industrial robotic arm 104 to execute precise instrument gripping in a cluttered environment with a 2-dimension (2D) reference point as the picking location. The gripper 106 has three compliant degrees of freedom—(i) pitch and (ii) roll of the electromagnet 108 and (iii) translation along a direction perpendicular to the table 101. The gripper 106 performs as determined by the vision system 100, specifically as programmed by the computer processor in collaboration with the camera 102.

In one embodiment, the camera 102 sends a 24 million pixel image. In the embodiment of FIG. 1, the camera 102 operates remotely by connection with a USB cable 112 to the server 103. In another embodiment, the camera operates remotely by wireless network connection to the server or computer processor 103.

The flexibility of the end-effector 106 allows for computing a four degrees-of-freedom (4-DOF) pose, including two-dimensional (2D) location, rotation and scale (much more robust than computing a 6-DOF (3D) pose due to the optically-challenging nature of surgical instruments). As such, the system in one aspect comprises a flexible end-effector 106 that rotates about the x and y axes and translates along the z axis. (See FIG. 6).

In one aspect, the automated sorting solution is robust to handle a varied instrument suite, including any number, shapes, and sizes of instruments. In addition, since the end-effector is electromagnetic, the system works in handling ferromagnetic instruments, including metals and alloys such as iron, nickel, cobalt, steel, and other ferromagnetic materials.

As illustrated in FIG. 1, the robotic system 100 for surgical instrument manipulation integrates a vision-guided robot manipulator 104 for singulating individual surgical instruments from a cluttered environment; a computer algorithm used in combination with the system identifies the instrument, estimates the 4-DOF poses while determining positions of the objects that are not occluded in a pile; and an electromagnetic gripper 106 with multi-axis compliance grips surgical instruments. The system determines the instruments not occluded by any other instrument. In the event when several instruments are occluded, the vision algorithm automatically determines the instrument that is occluded by the least amount.

In one aspect, more than a dozen different instruments are in one container or tray 200. The instruments are in a clutter, or unordered pile, as they are disposed for use, for sterilization, and/or contamination holding. As compared to various complex systems, the system of the invention disclosed herein uses a digital single-lens reflex (DSLR) camera without the need of multiple lights and multi-views. Thus, it is cheaper and easier to implement. Instead of 6-DOF pose, a 4-DOF pose in 2D space is estimated to guide the gripper. It should be noted that other cameras with varying lens configurations and imaging parameters (e.g., exposure, aperture) may be utilized in various arrangements and in creating images of various sizes, shapes, and resolution.

Figure 7:
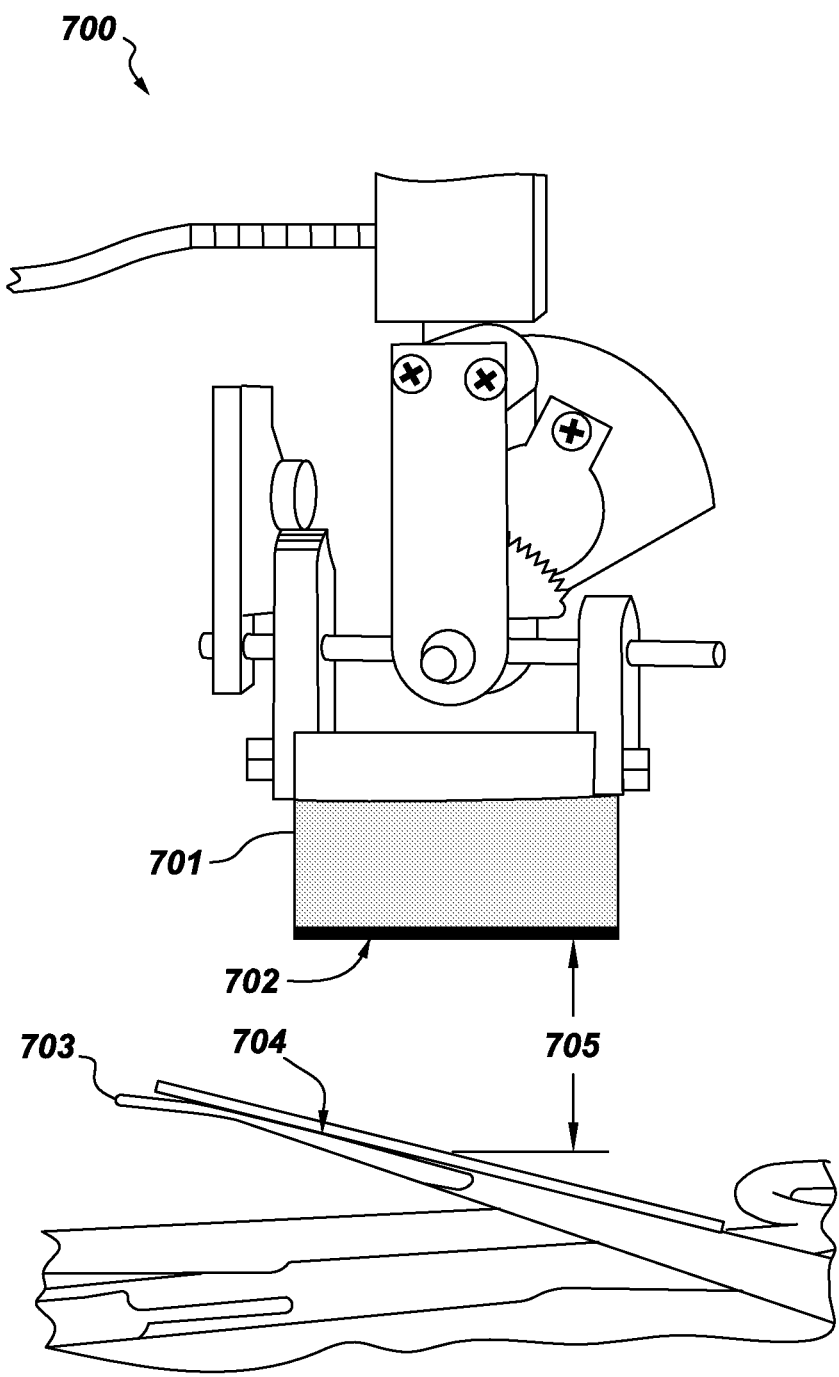
FIG. 7 illustrates the identification of the top instrument and approximate surface orientation of the electromagnet and the instrument before contact.

In another aspect, the pick-and-place robot manipulator easily grips the instrument 202, without reference to shape or design of the instrument, but rather as to the planar surface alignment (See FIG. 7). In various embodiments, the robot manipulator can pick and place instruments of irregular shape and design, or even those having uneven surfaces. The invention further provides the advantage of handling surgical instruments in a cluttered environment, while preventing, avoiding, or minimizing collision. For exemplary purposes, and not limitation, the vision algorithm detects a gripping point on an instrument that has the least occlusion to reduce the possibility of potential collision between the gripper and other instruments. The robot manipulator arm is preprogrammed given the environment, including but not limited to surrounding structures, tray size, shape and dimensions, as well as information as to the sizes and shapes, or rather variance in the size, shape and dimensions of instruments.

Embodiments of the invention utilize an electromagnetic gripper that can generate gripping force in a very compact form that permits the electromagnet 108 at a terminal end grip objects with irregular shapes, particularly without knowing surface orientation (e.g. single object lying on a flat surface or multiple objects have a large shape variance) of the instrument. The electromagnetic gripper has 3-DOF compliance, which allows the electromagnet to passively reorient and conform to the instrument surface. The flexible nature of the electromagnetic gripper 106 allows the magnet surface 109 of the electromagnet 108 to align with a surface of an instrument 201.

In one embodiment of the invention, as in FIG. 1, the computer processor 103 is a server processor remote from the system location. In this aspect, the camera 102 can connect and communicate via USB cable or wirelessly to the server processor. In another aspect, the computer processor may be a desktop processor or configured to store information in memory and retrieve information in real-time.

Figure 11:
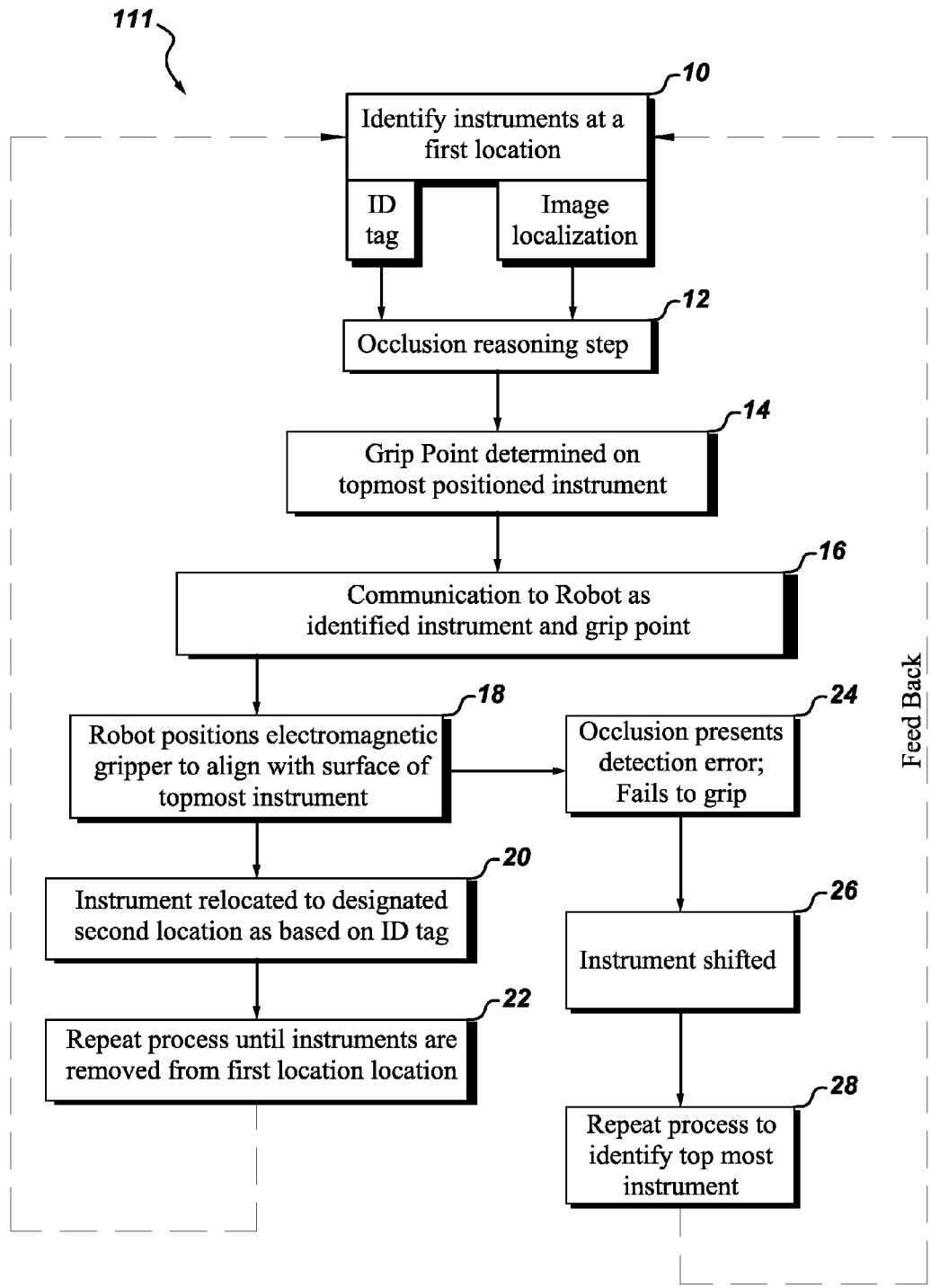
FIG. 11 is a schematic representation of an embodiment of the system and method of use.

In a method of utilizing the system of the invention, as illustrated in a schematic of FIG. 11, the robotic system 111 first identifies surgical instruments (10) within a container for asset tracking purposes (via each instrument's barcode identification tag via a barcode reader or camera with barcode reading software) and computes their poses (by way of the camera). For exemplary purposes, and not limitation, the surgical instruments are those returned from an operating room and piled in a container or tray without any organization (i.e. typically, designated for sterilization). Then, an occlusion reasoning step (12) determines which instruments are on top of the pile and/or not occluded by other tools/instruments. Those not occluded are usually on top of the pile where multiple instruments are cluttered. These [top] instruments are candidates for gripping and singulation. In the event when all instruments are occluded, the vision algorithm automatically determines the instrument that is occluded by the least amount. Next, a grip point is determined (14) and communicated to the robot manipulator (16). The robot manipulator picks up the surgical instrument (18) and places it in an appropriate location (20) based on the instrument identification (ID) tag. The process is repeated (22) until the instruments are removed from the container. As referenced above, to achieve this manipulation, a high resolution DSLR camera is mounted over the robot manipulator. The camera captures top down view of a pre-defined region within the robot's work space.

Where occlusion presents a detection error and the gripper fails to grip an instrument (24), the processor attempts to re-identify the top-most instrument via communication with the robotic system. It is very likely that the pile of instruments has shifted (26), or can be shifted (via a sequence of magnetic gripper movements with activation of the electromagnet to disturb the instrument in the tray) during the failed attempt and the top instrument can be identified in the re-attempt (28). If occlusion still presents a detection error, the process is repeated (28).

In one embodiment, the computer-implemented method of detecting and manipulating a plurality of instruments is disclosed, the computer including a computer processor and a camera with a barcode reading software module; the method comprising the steps of: creating a template image of each of the instruments by way of the camera and storing the template images in memory; capturing an input image of the plurality of instruments; identifying each of the instruments by using the barcode reading software module that (i) reads an identification tag from each of the instruments and (ii) localizes reference points of the identification tag, each of the identification tags encoding a unique identifier; retrieving the template image from memory that corresponds to the identification tag; aligning one or more edges of an instrument in the input image with edges of the instrument in the template image by computing an initial affine transformation; computing an occupancy map that models one or more intersections between the instruments; and synthesizing occlusion relationships that correspond to one or more hypotheses, wherein the input image is compared against at least a first hypothesis and a second hypothesis; wherein the template image and the input image are two dimensional and utilized in combination to select a top-most instrument from a cluttered pile.

Aspects of the invention utilize template images that include a foreground mask corresponding to the segmentation of each of the instruments. In another embodiment, one or more template images and associated foreground masks are used for an instrument that have N stable positions and have N barcodes. The template and foreground mask may be manipulated into any number of configurations for constructing and implementing the algorithm.

Vision-Based Instrument Localization a. Identification

FIG. 2A illustrates a topmost image 222 captured by the camera that looks downward on the container or tray 200 in order to pick and place the surgical instruments 202 using the robotic manipulation system of the invention. The algorithm used in combination with the system computes a 2D reference point as the grip location 221 for an instrument that is on top of the pile (here, circled for identification purposes). FIG. 2B depicts an enlarged view of the image from FIG. 2A. Each surgical instrument 202 utilized in the system is equipped with a 2D data matrix barcode 223 encoding a unique ID for the particular tool. Multiple barcodes 223 are illustrated as squares (as depicted in the magnified image). The barcodes 223 are placed on a planar surface of the instrument. Missed detections due to occlusion 225 are highlighted (for description purposes) by a circle in this image. The barcode is small, ranging from about ⅛ inch to ¼ inch in diameter, making them suitable for tracking objects with small flat surfaces. Any size or shape barcode may be utilized, however, including a data matrix in two dimensions (2D), various codes, or identification tags. A barcode reader or a high-resolution camera with barcode reading software may be used to locate and read the IDs of the visible barcodes. The integration of barcode reading software module with the camera allows simultaneous tracking and imaging of the instruments. To ensure identification within a cluttered stack, two barcodes are placed on each instrument (one on each opposing side/surface of the instrument). In one aspect, the surgical instruments have two possible stable placements; in another aspect, any number of ID tags may be placed on surgical instruments having various shapes, sizes, varying numbering of surfaces and configurations. For non-flat instruments (e.g. forceps), a cap is used to close the tips, reducing the potential for alternate stable orientations that may limit barcode visibility. In addition, the barcodes are configured to correspond to their placement on an instrument or object. In one aspect, the barcode is any size and shape, and may even have multiple dimensions. As illustrated, the embodiment comprises a 2D barcode.

b. Pose Estimation

Given the instruments IDs in the container or tray, the system of the invention estimates 4-DOF pose (i.e. location, orientation, and scale) for each instrument. FIG. 3 shows a visualization of the instrument localization and pose estimation step 300. This is achieved by matching a template of each instrument to its pose in the tray. The template is an image of the instrument captured in front of a black background. The instrument is segmented and a foreground mask created by using thresholds and removal of small connected components. For each detected barcode within the tray, its counterpart template is retrieved from the library. The barcode reading software module not only reads the ID, but also detects the four corner points of the data matrix. By using the four corners on both the input tray image and the template image, an initial affine [geometric] transformation 302 is computed that brings the templates into alignment with the instruments in the tray image. The estimated affine transformation is subsequently refined using a non-linear optimization. Because of the similar appearance of the surgical instruments and occlusions within the scene, a typical cost function to minimize the distance between re-projected and original point features is not possible. Instead, the edges for both the template and the input image are determined. Then, the distance transform on the edge map of the input image is computed. In this way, the distance between the transformed template edges and edges on the input image can be approximated quickly by summing the pixels at transformed template locations in the distance transform. Downhill simplex is used to perform the non-linear optimization. As illustrated in FIG. 3 for visual purposes, the edge maps of templates are superimposed onto the input image to show the greater effectiveness of alignment after pose refinement 304.

In one aspect, the projective transformation is more accurate for estimating pose of tilted surgical instruments in which affine transform is used such that the optimization has fewer parameters (e.g. 6 vs. 8); thus faster convergence. Due to the robust occlusion reasoning algorithm and compliant end-effector design, perfect pose estimation is not required for successful robotic gripping and placing.

Occlusion Reasoning

Given the poses of instruments whose barcodes are visible, the system then infers the occlusion relationship between each pair of intersecting instruments. This determines which instruments are not occluded by others and thus possible for the gripper to pick up next.

a. Finding the Intersections

FIG. 4 illustrates an occupancy map 400 and the intersection regions between a few pairs of instruments. The system first computes an occupancy map 400 that models the intersections 403, 404, 405, 406 between the various clustered instruments 410. The occupancy map 402 is a single channel image. Each bit of a pixel is assigned to one instrument. Each template is transformed along with its foreground binary mask using the computed affine transformations. The transformed binary mask is then stored in the designated bit in the occupancy map. In this way, the intersecting regions 403a, 404a, 405a, 406a between two instruments 403a, 404a, 405a, 406a can be easily determined by finding the occupancy map pixels which have the two corresponding bits.

b. Inferring the Occlusions

For every pair of intersecting surgical instruments A and B, two hypothetical occlusion relationships exist: (i) A occludes B; or (ii) B occludes A. For each pair, two images are synthesize, each of which corresponds to one of the two hypotheses ($H_1$ and $H_2$). The images are synthesized by transforming the templates to their poses in the input image and rendering them in two different orders. The occlusion relationship is then inferred by comparing the input image I against the two hypothesis images; $H_1$ and $H_2$ differ at the intersecting regions and are identical for the rest of the pixels. Using the intersecting region computed from the occupancy map as a binary mask, I is compared against $H_1$ and $H_2$ within the masked region.

In one aspect, the mask is dilated by a small amount to account for inaccuracy in the estimated instrument pose and to ensure that intersection regions are included in the binary mask. To compare the images, descriptors called Edge Orientation Histograms (EOH) are utilized, similar to Histograms of Orientated Gradients (HOG). EOHs are contrast invariant and use edges instead of appearance information, and further handle large appearance changes in the captured images due to varying lighting conditions, specularities, and inter-reflections among the surgical instruments. To reduce noise and focus on the more important contour edges, the input images are first blurred with a Gaussian kernel. The masked EOH descriptors for image I, $H_1$ and $H_2$ are computed as well as the Eculidian distances between them. The hypotheses H with small histogram distance to the input image I is selected:

$$\hat{H} = \underset{H_i}{\operatorname{argmin}} \|meoh(I) - meoh(H_i)\|_2, \text{ where } i = 1, 2$$

FIG. 5 shows a query image I (502), the intersection mask 504, and two hypotheses 506 and 508. The edges on the forceps (bottom object) 503 are different in the query image I and hypothesis images, $H_1$ (506) and $H_2$ (508), due to the template and actual input image being captured under different lighting conditions. In one aspect, strong presence of edges 501 defining the scissors (top object) 505 allows the process to select the correct hypothesis (506 in this case).

c. N-Instruments Intersection

In the case of more than two instruments intersecting at the same region, the method correctly predicts the one that is on the top of the pile. For exemplary purposes, and not limitation, if A occludes B and C, because of a strong presence of A's edges in the query image I, the algorithm will predict A occludes B and C in two separate reasoning steps. The relationship between B and C may not be recognized since the process looks for one instrument not occluded by others. In other words, the process is not attempting to sort the entire set in one step since the pile of instruments may shift after each gripping. Instead, once A has been picked up, the relationship between B and C will be determined again in a later iteration.

Picking Order Determination

Various aspects of the system assume that the instruments with occluded barcodes will likely be bottomside, and are unlikely to occlude the top-most instrument. In such circumstance, the algorithm maintains the ability to predict the top instrument for selection. Once the occlusion relationships are determined, the algorithm finds the non-occluded ones, such as the instruments that do not intersect with others or those that are on top of others.

Various embodiments of the invention integrate a system such that the algorithm randomly selects one of the candidate instruments for the robot manipulator. In one embodiment, the picking location for each surgical instrument is determined empirically in the template creation stage.

Optimal Picking Location

Embodiments of the system also include an optimal picking location (a 2D point for each instrument that is determined in real-time). For every point on the target instrument, a bounding box is defined whose size is about the same as the gripper and centered on the point. Then, the area ($A_t$) of the target instrument within the bounding box is computed. The sum of areas of other instruments ($A_o$) within the bounding box is also computed. Then, for defined points on the target instrument, the ratio $R=A_t/A_o$ is computed. Finally, the point with the largest R is the optimal picking location. In this way, the contact area is maximized between the gripper and the instrument while, at the same time, the chance of other instruments interfering with the gripping is minimized. In one aspect, the area of the instrument within a bounding box is efficiently computed using computing integral images (a standard computer vision technology) on the occupancy maps computed earlier (See FIG. 4). In another aspect, a portion of the instrument (e.g., tip of tweezers) is excluded from optimal location computation to constraint the gripping at feasible locations of the instrument.

Since the camera captures a top-down view of the container, the image plane is parallel to the robot's working surface. Thus, the picking location in the image space is easily translated into the robot's coordinate using a linear transformation. Compliant end-effector and robot manipulator design allows imperfection in the transformation and allows for less accurate reference points for gripping. The picking height (normal to the image position) is approximated based on known information for the given container and table surface heights.

In another aspect, after singulating each instrument from the unordered pile, an additional step places the instruments into their pre-defined slots in a surgical kit. With the already computed orientation and picking location of the object, an angle and a translation in the horizontal plane is then computed to allow the robotic arm to rotate around its z-axis, translate horizontally, and drop the instrument to a pre-defined slot in the surgical kit. In this way, instruments can be packed into kits that are to be sterilized on the clean side of the sterile processing service (SPS) center.

End-Effector Design

Figure 6:
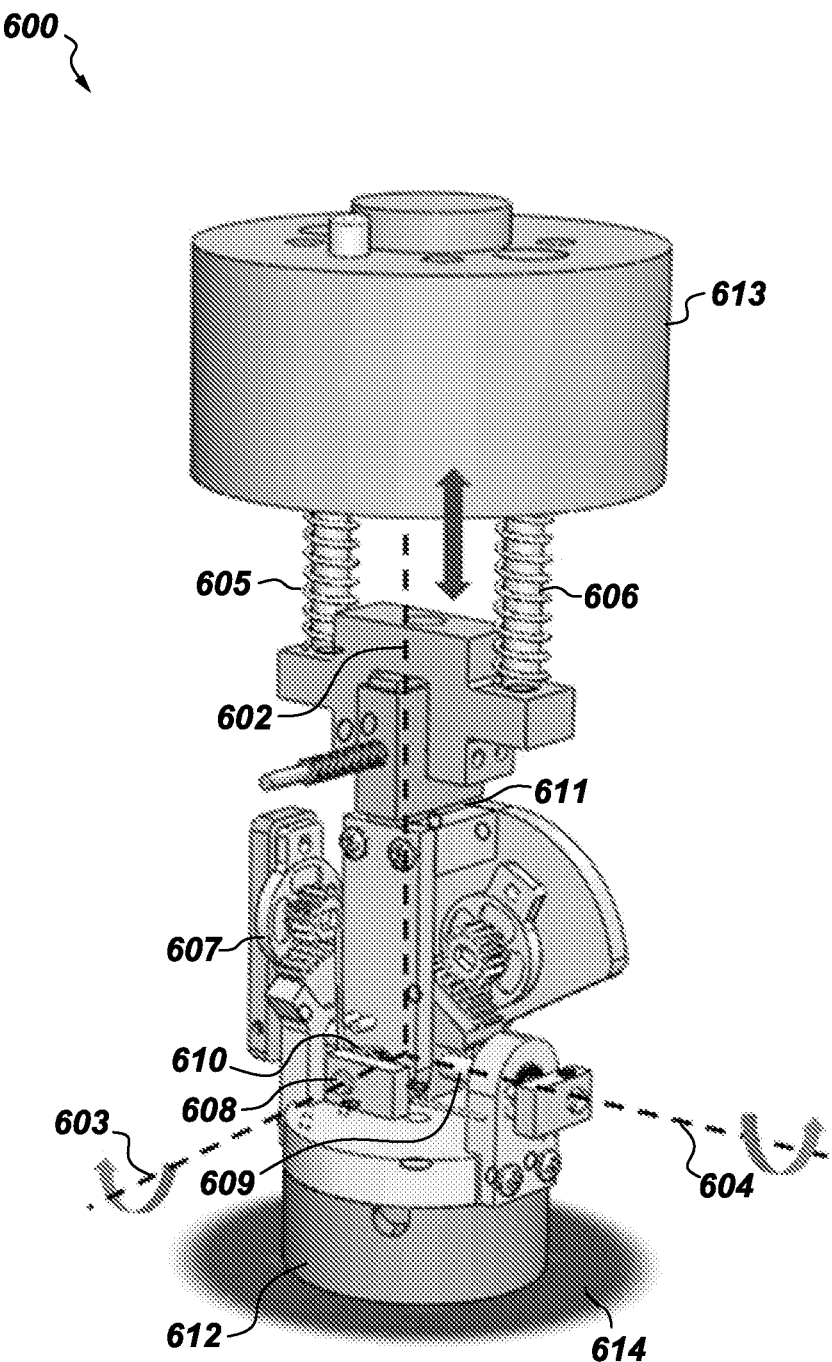
FIG. 6 illustrates an embodiment of the electromagnetic gripper.

The electromagnetic gripper of the invention is designed to grip a surgical instrument in a cluttered environment given a 2D reference point as the picking location. An illustration of the gripper 600 is shown in FIG. 6. The electromagnetic gripper 600 has an adaptor 613 at a proximal end for connection to a robotic arm; an electromagnet 612 at a distal end for picking up an instrument along a corresponding planar surface; and various mechanical components there-between as discussed below. The surface of the instrument may vary in size, shape, and dimension, but in one aspect the electromagnet surface correlates with the designed size, shape, and dimension of the instruments awaiting manipulation.

The electromagnetic gripper 600 has three passive joints: a prismatic joint along the z-axis (602) and two revolute joints along the x and y axes 603 and 604, respectively. Prismatic joint along axis 602 has coil spring 605 attached to the shafts 606 to make the joint compliant. Revolute joint shafts 608 and 609 have torsion springs 610 attached to their respective shafts for rotational compliance. A rotary damper 607 is attached to each of the revolute joint shafts x (608) and y (609) to prevent instrument oscillation after picking up and during transport. A load cell 611 is used to measure the contact force between the electromagnet 612 (as determined by an electromagnetic field 614 and the instrument). For example and not limitation, a threshold force $F_t$ (e.g. 7N) is utilized to determine when the electromagnet is in proper contact with an instrument (i.e., no gap between the electromagnet and instrument). The load cell also measures the weight of an instrument which can be used to detect gripping errors (e.g., multiple instrument gripping, loss of instrument, incorrect instrument, etc.). As depicted here, the electromagnet 612 is attached at the bottom portion of the gripper 600.

In one embodiment the electromagnetic gripper is flexible and has a range of movement of about +/−15 degrees about the x and y directions; and about 20 mm in the z direction. In another embodiment, without limitation, the electromagnetic gripper can be secured in a fixed position so as to prevent oscillation when moving heavier objects/instruments.

In various embodiments of the system of the invention, the electromagnetic gripper may be used to pick and place instruments, objects, and parts ranging in size and shape. In one aspect, the gripper generates 20 pounds of force (lbf) on a flat metal sheet. The force changes with varying contact area between the instrument and electromagnet. While the instruments can be small or large, and have a large size various, taking various shapes and forms, the instruments may also conform to size limitations as dependent on the size of the electromagnet. Using the electromagnet of FIG. 6, the electromagnet has a circular surface area with cylindrical shape; dimensions of which are about 1.37 inch diameter and about 0.515 inches thick. In the embodiment of FIG. 6, instruments of various sizes and shapes may be picked and placed, but may be limited as to the weight of the instrument or object, with the system able to pick and place any surgical instrument or object for manual manipulation.

In various embodiments and without limitation, the system may be modified or configured so as to align the desired instrument handling specifications with the design of the electromagnetic gripper and its corresponding electromagnet. Such size adjustments will be apparent to one skilled in the art, as well as the modifications to adjust the respective sizes and shapes of the components and features of the system.

In one aspect, to reduce potential adherence between a target instrument and an adjacent instrument, the current of the electromagnet is modulated by a servomotor drive to generate a gripping force just enough to pick up the target instrument. The robot arm and electromagnetic gripper are controlled by a controller. The load cell and servomotor drive interface with a robot controller through an analog I/O module. In one aspect, the servomotor drive is a current regulator. In another aspect, any power amplifier or motor drive may be implemented. An electromagnetic current value is empirically determined for picking up each instrument, the value stored in a look-up table, as indexed by the instrument identifier (ID). The look-up table references the data that is stored locally on the robot controller in accordance with one embodiment. In another embodiment, the data is stored on a remote database, including, but not limited to, the computer vision processor. As such, data is retrievable by various network communications. Furthermore, the data is capable of being retrieved in real-time, with additional capabilities to facilitate automation.

An illustration of instrument pickup workflow is shown in FIG. 7. Given the 2D gripping location and the ID of the target instrument, a pick-up maneuver is completed with the following three steps:
  i. A robot arm moves the gripper 700 to the gripping location and stops at a distance h (705) above the instrument. Distance h is experimentally determined (e.g. about 8 cm) to avoid any potential collision during this step.
  ii. The robot arm approaches the target along the z-axis. When the surface 702 of the electromagnet 701 comes in contact with the target surface 704 of the instrument 703, the electromagnet re-orients itself to align with the instrument target surface, regardless of their initial relative orientations. The robot controller constantly and consistently monitors the contact force until threshold contact force $F_t$ is reached, thus indicating full contact with the target.
  iii. The electromagnet is energized to pick up the instrument. The current is adjusted to the pre-calibrated value for given instrument ID. The robot arm moves the electromagnetic gripper to lift the instrument and remove it from the container.

In the case where the manipulator is not able to grip an instrument successfully, following 2 failed attempts, the system will move on to the next available instrument. When the scene is further de-cluttered, the system will eventually attempt to grip the failed object again. In the rare situation where several instruments are occluded (i.e., an occlusion cycle is presented or a detection error in the vision algorithm), the algorithm selects the instrument that has the smallest number of occlusions and uses occlusion size as a tiebreaker. Because of the compliant design, gripping an instrument in such a situation is not problematic.

experiments

In one embodiment, the system is an automated instrument handling system, an automated robotic system equipped with a robotic manipulator arm, a camera, and the electromagnetic gripper. A camera with a 6000×4000 pixel resolution is used to detect very small 2D barcodes on the instruments. In one embodiment, at least 70×70 pixels are utilized to decode a 2D barcode. In another embodiment, the occlusion reasoning algorithm performed at a much lower resolution at 1200×800 pixels. To suppress small edges a noise, a 7×7 Gaussian kernel blurs the images before performing the histogram computation.

For exemplary purposes, the following experimental run was performed multiple times. In the first run, the container is filled with approximately 15 surgical instruments. The robot manipulator successfully singulates and removes the instruments 802 from the container 801, as illustrated in FIG. 8, sequentially removing the top-most instruments, proceeding from image FIG. 8A (1) through to image FIG. 8L (12). As depicted, the image sequence 800 is captured by the camera before each grip. The next instrument to be removed is then highlighted (here, circled for illustration purposes). The 2D reference gripping location is also label by a "+".

Figure 9A:
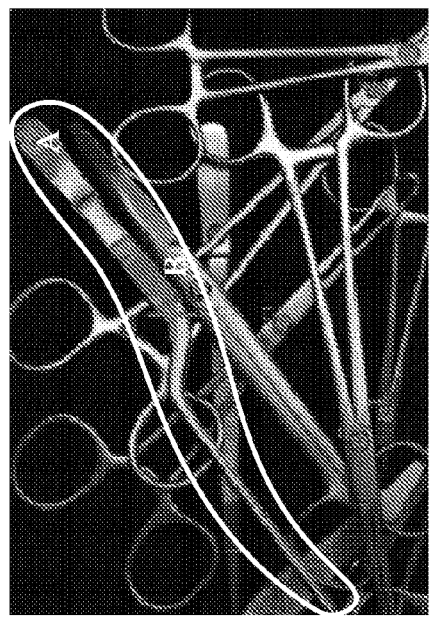
FIG. 9A depicts a first instrument A to be removed but is occluded.
Figure 9B:
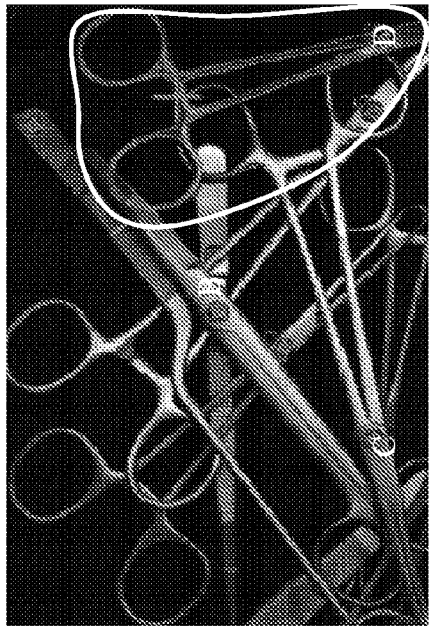
FIG. 9B demonstrates that the system then identifies instrument D to be removed.
Figure 9C:
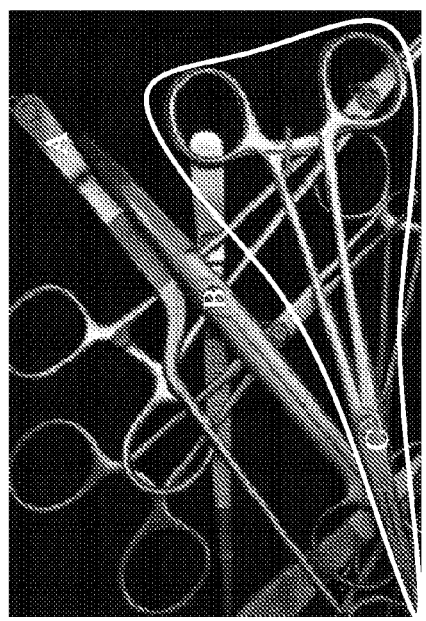
FIG. 9C identifies instrument C to be removed after the instrument from FIG. 9B.
Figure 9D:
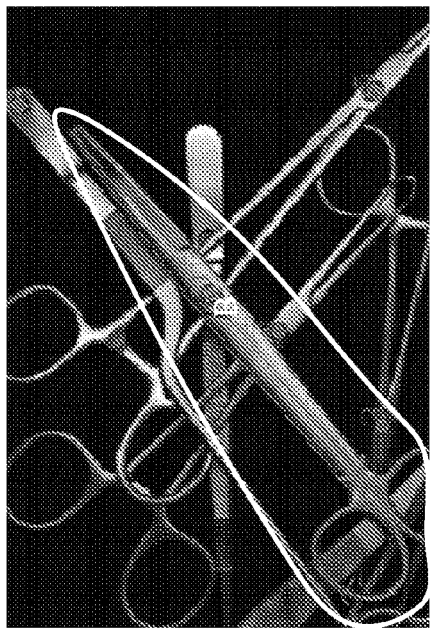
FIG. 9D identifies an instrument B to be picked up and removed from the clutter.

During a second run, the manipulator failed to grip one instrument because two instruments were aligned closely side by side. See FIG. 9, forceps A and scissors B. The electromagnetic gripper makes contact with scissors B first and is not able to lift it up due to insufficient gripping force. After two failed attempts, the system decides to pick up the next available instrument. Because the instruments shifted during the failed attempt, an occlusion cycle exists as shown in FIG. 9b: D occludes C, C occludes B, and B occludes D. Since instrument D is occluded the least amount, the system determines to singulate D first. After removing D, instruments C and B are de-occluded and removed subsequently (FIGS. 9c and 9d).

Figure 10B:
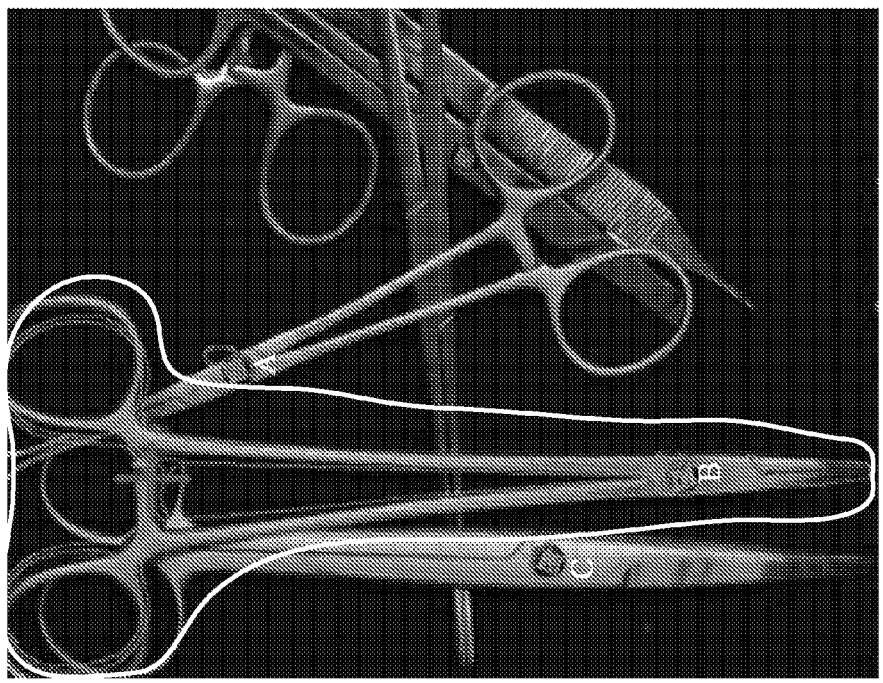
FIG. 10B illustrates correct identification of the topmost instrument in the altered configuration.
Figure 10A:
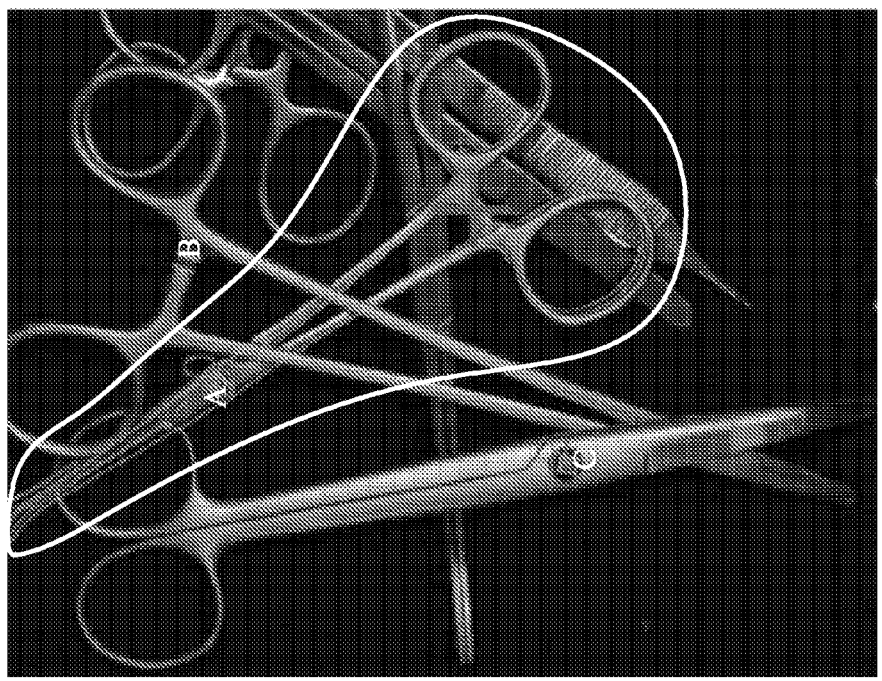
FIG. 10A portrays an occluded barcode in one embodiment and the incorrect identification and retrieval of the topmost instrument where a barcode is occluded; this is followed by the shifting of instruments; and then

In the circumstance that an instrument is occluded by another instrument whose barcode is not visible, as in FIG. 10a, the vision system may not be aware of the presence of an occluding instrument. As shown in FIG. 10a, instrument A is occluded by instrument B. Since B's barcode is occluded by instrument C, the vision system is not aware of B's presence and determines A is on top of the pile. The system attempts to grip instrument A but fails, resulting in shifted instruments in the tray. See FIG. 10b. Due to the shifting of the objects, instrument B's barcode is now revealed. The robot manipulator recovers from the previous failure and singulates instrument B.

The flexible robotic manipulation system herein disclosed identifies, singulates, and removes an individual surgical instrument from a tray with a cluttered environment. The computer vision algorithm incorporated in the system is robust against optical challenges such as changing light conditions, specularities, and inter-reflections among the surgical instruments. The design of a compliant electromagnetic gripper allows for computing 2D pose estimation instead of more challenging 3D pose. Although the robot manipulator is utilized here for surgical instrumentation manipulation, the system and integrated components can be used in various other applications to mobilize substantially planar objects. Such objects may include tools of various design, and industrial parts for use in manufacturing, research, and sterile settings.

Further advantages of the invention include the use of a standard demagnetizer that can be implemented on the underside of the container to prevent the tendency of the instruments becoming magnetized over time. In addition, instruments with a pivot (e.g., scissors, clamps) are closed in the system, but may remain open where the algorithm is extended to handle open instruments. This comprises identifying the instruments, finding the pivot location, and performing template matching on the two portions separately. In another aspect, the open instruments may be in a locked position to allow template matching of the complete instrument, as when it is closed.

In another aspect, the electromagnet itself is used for demagnetization. When placing an instrument at a target location, and while the instrument is still in contact with the electromagnet, an alternating current in the electromagnet is applied with decaying amplitude to effectively remove residual magnetism. For example, and not limitation, current is $I(t)=A\ e^{-b*t}\sin(wt)$, $b>0$. Parameters A, b and w are adjusted for maximum effectiveness. Experiment result shows that residual magnetism is reduced to <10 Gauss with such method.

In other embodiments, the system handles instruments that are non-planar. By placing a barcode at each stable position of an object and then creating a template at each of those positions, the system can mobilize the instruments from one tray into another.

Additional embodiments of the system address error handling as well as the vision-based object verification algorithm. For instance, the verification system can be used to determine whether the top object is occluded by an unknown object. A verification step may also be implemented to verify whether or not the singulated instrument is the target instrument determined by the vision algorithm.

Equipping Other Robots with the Electromagnetic Gripper

Various aspects and features of the invention may be utilized in one or more embodiments of the invention. In one system, a robotic system with several finger-type grippers is outfitted with the electromagnetic gripper herein disclosed. The robotic system handles instruments on a flat surface, or any surface configuration, including curved surfaces. The electromagnetic gripper is also implemented for a static robot that runs Robotic Operating System (ROS). To control the gripper, a microcontroller is used as a bridge between the gripper electronics and ROS. A motor shield is used to modulate the current in the electromagnet. The microcontroller reads the force sensor through an analog-to-digital (AD) channel and sends a pulse-width-modulation (PWM) signal to the motor shield.

The gripper incorporated with robotic arms and machines has been tested to pick up an instrument. As with the static robot, the gripper is first moved to a small distance above the instrument and then approaches the pick-up location at low speed in a straight line to allow the electromagnet to conform to the instrument surface. For robot arms having compliance and rated at about 5 mm precision, the electromagnet may slide along the instrument surface for less than about a centimeter during contact. For exemplary purposes, and not limitation, given an electromagnet having a diameter of about 1.37 inches, less than about 1 cm position error may be acceptable for instrument pick and place depending on the size of the instrument.

As stated prior, embodiments taught herein may be used in a variety of applications to assist in the manipulation of instruments in surgical settings, during sterilization, preparation for use, among others. Such information may be useful in many different types of settings throughout the hospital, within outpatient, ambulatory, or inpatient settings. Other systems may be integrated in industrial production settings, particularly in sterile settings, or machined parts. Similar vision-based object verification algorithms can also be utilized in various robotic systems and instrument handling settings; the cameras implemented using any smart technology, smartphone, webcam, video, or other technology that implements image capture or streaming.

Having thus described several exemplary embodiments of the invention, it is to be appreciated various alterations, modifications, and improvements will readily occur to those skilled in the art. For example, in some embodiments, such alterations, modifications, and improvements are intended to be part of this disclosure, and are intended to be within the scope of the invention. Accordingly, the foregoing description and drawings are by way of example only.

What is claimed is:

1. A computer-implemented method of detecting and manipulating a plurality of instruments, the computer including a computer processor, and a camera with a barcode reading software module; the method comprising the steps of:
   creating a template image of each of the instruments by way of the camera and storing the template images in memory;
   capturing an input image of the plurality of instruments;
   identifying each of the instruments by using the barcode reading software module that (i) reads an identification tag from each of the instruments and (ii) localizes reference points of the identification tag, each of the identification tags encoding a unique identifier;
   retrieving the template image from memory that corresponds to the identification tag;
   aligning one or more edges of an instrument in the input image with edges of the instrument in the template image to compute an initial affine transformation;
   computing an occupancy map that models one or more intersections between the instruments; and
   synthesizing occlusion relationships that correspond to one or more hypotheses, wherein the input image is compared against at least a first hypothesis and a second hypothesis;
   wherein the template image and the input image are two dimensional and utilized in combination to select a top-most instrument from a cluttered pile.

2. The computer-implemented method of claim 1, wherein each of the template images includes one or more segmented images of the instrument to create a foreground mask.

3. The computer-implemented method of claim 1, wherein the identification tag is a two-dimensional (2D) data matrix barcode.

4. The computer-implemented method of claim 3, wherein the reference points in said step of identifying are four corner points of the 2D data matrix barcode.

5. The computer-implemented method of claim 3, wherein the step of identifying includes localizing the position of a selected instrument in relation to the plurality of instruments which are remaining in a cluttered environment.

6. The computer-implemented method of claim 1, wherein the step of aligning the initial affine transformation is subsequently refined using a non-linear optimization.

7. The computer implemented method of claim 1, further comprising a step of refining the initial affine transformation using non-linear optimization by determining edges of the template image and edges of the input image to create a distance transform that computes the distance between the edges of the template image and the edges of the input image.

8. The computer-implemented method of claim 7, wherein the distance between edges of template image and edges of the input image is approximated by summing pixels at transformed template edge locations in the distance transform.

9. The computer-implemented method of claim 1, wherein the occupancy map is a single channel image and each bit of a pixel in the occupancy map is assigned to a foreground binary mask of the template image of one instrument.

10. The computer-implemented method of claim 1, wherein the step of synthesizing includes rendering each occlusion relationship in a different sequential order.

11. The computer-implemented method of claim 1, further comprising a step of picking up the top-most instrument using an electromagnetic gripper attached to a robotic arm.

12. The computer-implemented method of claim 11, wherein the electromagnetic gripper has an electromagnetic current value that corresponds to each of the instruments, the electromagnetic current value stored and referenced in a table indexed by the identification tag of each of the instruments.

13. The computer-implemented method of claim 12, wherein the electromagnetic gripper can interface with a robot controller or the computer processor.

14. The computer-implemented method of claim 13, wherein the electromagnetic current value is transferred to the computer processor or to the robot controller, alone or in combination, to automate control of the electromagnetic gripper.

15. A vision-guided robotic system for instrument singulation comprising:
    a robotic arm;
    a camera comprising a barcode reading software module to identify and image the plurality of instruments;
    one or more instruments positioned in a clutter;
    a computer processor to implement the steps of:
        creating a template image of each of the instruments by way of the camera and storing the template images in memory;
        capturing an input image of the plurality of instruments;
        identifying each of the instruments by using the barcode reading software module that (i) reads an identification tag from each of the instruments and (ii) localizes reference points of the identification tag, each of the identification tags encoding a unique identifier;
        retrieving the template image from memory that corresponds to the identification tag;
        aligning one or more edges of an instrument in the input image with edges of the instrument in the template image to compute an initial affine transformation;
        computing an occupancy map that models one or more intersections between the instruments; and
        synthesizing occlusion relationships that correspond to one or more hypotheses, wherein the input image is compared against at least a first hypothesis and a second hypothesis;
    wherein the template image and the input image are two dimensional and utilized in combination to select a specific instrument from the clutter.

16. The vision-guided robotic system of claim 15, wherein the robotic arm comprises an electromagnetic gripper.

17. The vision-guided robotic system of claim 16, wherein the electromagnetic gripper has an electromagnetic current value for each instrument that is stored in a table indexed by the identification tag of the instrument.

18. The vision-guided robotic system of claim 17, wherein the electromagnetic current value is provided to the computer processor or to the robotic arm to facilitate movement of the electromagnetic gripper.

19. The vision-guided robotic system of claim 18, wherein movement of the electromagnetic gripper is automated.

20. The vision-guided robotic system of claim 16, wherein the electromagnetic gripper comprises:
    at least three passive joints along an x-axis, a y-axis, and z-axis; each joint having a spring attached to a shaft to make the joints compliant; the passive joints comprising a prismatic joint along the z-axis and two revolute joints along the x and y axes;
    a rotary damper attached to each of the revolute joint shafts;
    an electromagnet attached to a bottomside of the electromagnetic gripper, current of the electromagnet modulated by a power amplifier to generate gripping force via electromagnetic current to pick up a target instrument; wherein the electromagnetic current for each instrument is determined empirically and stored in the processor as indexed by instrument identification tag;
    an adaptor for attachment to the robotic arm; and
    a load cell interfaced with a controller through an input-output (I/O) module to control the robotic arm and the electromagnetic gripper, alone or in combination.

21. The electromagnetic gripper of claim 20, wherein current of the electromagnet is modulated by a power amplifier to pick up a target instrument.

22. The electromagnetic gripper of claim 20, wherein the electromagnet interfaces with a robot controller that is capable of automating control of the robot arm and the electromagnet, alone or in combination.

* * * * *